US007322461B2

(12) United States Patent
Szentistvany et al.

(10) Patent No.: US 7,322,461 B2
(45) Date of Patent: Jan. 29, 2008

(54) GUIDE RAIL FOR STAIRLIFTS

(75) Inventors: Andreas Csaba Szentistvany, Hampshire (GB); Alan Neil Russell Stannah, Hampshire (GB)

(73) Assignee: Stannah Stairlifts Limited, Hampshire (GB)

( * ) Notice: Subject to any disclaimer, the term of this patent is extended or adjusted under 35 U.S.C. 154(b) by 226 days.

(21) Appl. No.: 10/535,021

(22) PCT Filed: Nov. 5, 2003

(86) PCT No.: PCT/GB03/04746

§ 371 (c)(1),
(2), (4) Date: May 19, 2005

(87) PCT Pub. No.: WO2004/043845

PCT Pub. Date: May 27, 2004

(65) Prior Publication Data

US 2006/0027445 A1 Feb. 9, 2006

(30) Foreign Application Priority Data

Nov. 13, 2002 (GB) ................................ 0226418.2

(51) Int. Cl.
*B65G 17/20* (2006.01)

(52) U.S. Cl. ...................... 198/678.1; 104/93; 187/201

(58) Field of Classification Search ............ 198/678.1, 198/465.4, 860.1; 187/201; 104/93, 109; 297/475
See application file for complete search history.

(56) References Cited

U.S. PATENT DOCUMENTS

| | | | | |
|---|---|---|---|---|
| 3,966,022 | A * | 6/1976 | Cheney | 187/201 |
| 4,602,567 | A * | 7/1986 | Hedstrom | 104/93 |
| 6,170,642 | B1 * | 1/2001 | Galan et al. | 198/678.1 |
| 6,446,560 | B1 * | 9/2002 | Slocum | 104/93 |
| 6,755,136 | B2 * | 6/2004 | Jenkins | 105/141 |
| 6,758,325 | B2 * | 7/2004 | Greeley | 198/687.1 |
| 2006/0185937 | A1 * | 8/2006 | Caroen et al. | 187/201 |

FOREIGN PATENT DOCUMENTS

| | | |
|---|---|---|
| EP | 0560433 | 9/1993 |
| EP | 0881188 | 12/1998 |
| NL | 1002545 | 3/1997 |

* cited by examiner

*Primary Examiner*—James R. Bidwell
(74) *Attorney, Agent, or Firm*—Marina Larson & Associates, LLC

(57) ABSTRACT

The present invention provides a stairlift rail of non-circular cross-section. The wall surfaces of the rail define a single internal cavity and the outer surface of the rail is free of additional members added to the rail in order to prevent rotation of a stairlift carriage about the rail axis.

9 Claims, 2 Drawing Sheets

GUIDE RAIL FOR STAIRLIFTS

This application is a 371 national phase of PCT/GB2003 004746, filed Nov. 3, 2003, and published in English as WO 2004/043845 on May 27, 2004.

FIELD OF THE INVENTION

This invention relates to stairlifts. More particularly, the invention relates to a novel form of rail for incorporation into a stairlift assembly, and to a stairlift assembly incorporating such a rail.

BACKGROUND TO THE INVENTION

As is well known, a stairlift assembly broadly comprises a rail which is mounted on a stairway, a carriage mounted on the rail for movement there along, and a chair mounted on the carriage. In the case of straight line stairlifts, where the stairlift assembly only traverses a straight section of stair, the rail is mounted at a constant angle to the horizontal and, accordingly, the chair can be fixed with respect to the carriage. In the case of curved stairlifts, however, sections of the rail are aligned at different angles with respect to the horizontal. Thus, a facility has to be included to rotate the chair with respect to the horizontal, to ensure the seating surface of the chair remains horizontal at all positions of the carriage along the rail.

Traditionally, the leveling function of a curved stairlift has been fabricated, at least in part, into the rail and the provision of the leveling function contributes significantly to the overall cost of the rail.

One common, early, example of a rail for a curved stairlift is formed from a metal section of constant cross-section. This form of rail operates in conjunction with a carriage on which the chair is rotatably mounted. A leveling bar is fixed, at varying angles, to the outer surface of the rail to provide a surface against which a linkage, forming part of the carriage, can bear. As the carriage moves along the rail, the action of the linkage against the leveling bar causes the chair to rotate with respect to the carriage, and thus maintain the seating surface level.

This form of leveling has been widely adopted but has its drawbacks. Firstly, considerable care must be taken, when fabricating the rail, to position and fix the leveling bar accurately. Secondly, there are limits to which one can reduce the size of the rail in order to accommodate the variations in alignment required by the leveling bar. Further, the need to add a leveling bar to the exterior surface of the rail inevitably detracts from the aesthetics of a stairlift installation.

As an alternative to the leveling arrangement described above, curved rails have been formed from two standard section tubes positioned in common vertical planes with the carriage being in rolling contact with both the upper and the lower tubes. By varying the distance between the tubes (which are typically of considerably smaller section than the constant metal sections referred to above), the carriage is caused to rotate with respect to the rail. Since, in this arrangement, the chair is fixed to the carriage, the chair will rotate with the carriage. Thus, by arranging variations in the tube spacing to coincide with changes in rail angle, the chair can be maintained level. One example of this form of rail is described in International Patent Application WO 96/20125.

In a variation to the twin tube arrangement, the rail is formed as an I-beam with the distance between the cross pieces of the I being varied to effect carriage rotation in the manner described above.

Again the twin-tube or I-beam rails have their drawbacks. Firstly, while the individual tubes may be quite small in section, the composite of the two spaced tubes (or varying section I-beam) results in a rail having significant depth. Further, it is difficult and costly to accurately locate and fix the components forming the rail so as to ensure accurate leveling—both in the direction of travel of the carriage, and perpendicular thereto.

Given the above drawbacks, considerable effort has been expended in arriving at solutions which transfer the leveling function from the rail to the carriage. The most successful of these solutions involve the use of a separate, electronically controlled, chair leveling motor to rotate the chair with respect to the carriage at each point along the rail at which the angle of the rail changes with respect to the horizontal. For convenience this mode of leveling will be referred to herein as electronic leveling.

One commonly available, electronically-leveled, stairlift incorporates a rail formed from a single round tube, the tube having a stability bar fixed to, and extending along, the outer surface thereof. The stability bar provides a surface against which reaction rollers can bear, to prevent the carriage from rotating about the rail.

An example of such a form of rail is disclosed in International Patent Application WO 97/12830. In this particular example the stability bar projects vertically down from the lower edge of the tubular rail and incorporates the rack which forms part of the drive system for the carriage along the rail. The advantage of this type of rail is that its basis is readily available, standard section, round metal tube. Such tube can be bent using readily available bending equipment which is an important consideration since all curved rails require a bending operation. Generally speaking, forming curves in non-round sections leads to unacceptable distortion of the section. As a consequence, bends have to be specially fabricated.

A significant disadvantage of the single round tube rail is that additional manufacturing input is required to form the stability bar and to fix the stability bar to the rail. Forming the stability bar also involves considerable material wastage.

The single round tube arrangement typically has less overall bulk than the spaced twin tube arrangement described above. However, the diameter of the tube currently used, being in the order of 76 mm, needs to be quite significant in order to give the requisite bending strength to the rail. This, in turn, severely limits the radii through which the tube can be bent. As a result, when the rail is to follow, say, a right-angled bend in a stairway, the rail will protrude from a corner a significant distance into the stairway. Further, the rail cannot be formed into a tight inside bend at the top or bottom of the stairs to enable the carriage to be moved into a convenient storage position, off the stairway.

In our published International Patent Application WO 02/064481 we describe a rail formed from two standard section metal tubes located one on top of the other, the individual tubes being considerably smaller in diameter than that from which the single tube rails described above, are formed. In this arrangement each tube is bent individually, using standard pipe bending equipment, to a desired shape. The two tubes are then nested together and fixed.

This arrangement has the advantage over the single round tube rail that, because the individual tubes are much smaller in diameter than the single tube, much smaller inside bends can be formed in the rail. Further, because the overall rail is non-circular in section, its inherent form provides resistance to rotation of the carriage about the rail and does not, therefore, require the addition of a stability bar. However, in experimental work conducted to date, we have not been able to successfully resolve the problems associated with forming rails from two individual tubes. The individual tubes must each be bent with slightly different curvature so that the two fit together accurately. Further, particularly on inside/outside bends and helicals, any slight vertical misalignment between the two tubes can lead to unacceptable forward or rearward tilting of the carriage.

It is an object of the present invention to provide a stairlift rail which goes some way in meeting the drawbacks of existing curved rail arrangements as outlined above, or which will at least provide a novel and useful alternative.

SUMMARY OF THE INVENTION

Accordingly, in a first aspect, the invention provides a tubular stairlift rail of non-circular cross-section having an internal surface and an external surface, said internal surface defining a single cavity within said rail; said external surface being free of fabricated additional members positioned to prevent rotation of a stairlift carriage about said rail.

In a second aspect the invention provides a tubular stairlift rail for use with a stairlift carriage, said carriage having support rollers to support said carriage for movement along said rail, said rail having a single internal cavity; roller engagement surfaces formed in the outer periphery thereof, said roller engagement surfaces being configured to, in combination with said rollers, prevent rotation of said carriage about said rail.

Preferably the arrangement of said roller engagement surfaces about the cross-section of said rail is configured to contribute bending strength to said rail.

Preferably the cross-section of said rail is devoid of right-angled corners.

Preferably said roller engagement surfaces are arcuate when viewed along the cross-section of said rail.

Preferably, when said rail is aligned in its intended mounting position, the maximum vertical dimension is greater than the maximum lateral dimension. The maximum vertical dimension is preferably in the order of twice the maximum lateral dimension.

Preferably said rail is symmetrical about both vertical and horizontal axis when said rail is aligned in its intended mounting position.

In a third aspect the invention provides a stairlift rail of substantially constant cross-section, all the elements which define said cross section being arranged about a common internal cavity, said cross-section including roller engagement surfaces arranged to:

(i) support a stairlift carriage for rolling movement along said rail; and (ii) in combination with said carriage, resist rotation of said carriage about said rail.

Preferably those roller engagement surfaces configured to provide resistance to the rotation of said carriage about said rail are further configured to contribute bending strength to said rail.

In a fourth aspect the invention provides a stairlift rail, said stairlift rail being characterised in that the cross-section thereof is non-circular but devoid of right-angled corners; said cross-section being symmetrical about both vertical and horizontal axes when said rail is aligned in its intended mounting configuration.

In a fifth aspect the invention provides a stairlift rail, said stairlift rail being characterised in that it is roll formed and the cross-section thereof is non-circular and configured to provide resistance to rotation of a stairlift carriage about the axis thereof.

In a sixth aspect the invention provides a stairlift assembly including a rail as set forth above.

Many variations in the way the present invention can be performed will present themselves to those skilled in the art. The description which follows is intended as an illustration only of one means of performing the invention and the lack of description of variants or equivalents should not be regarded as limiting. Wherever possible, a description of a specific element should be deemed to include any and all equivalents thereof whether in existence now or in the future. The scope of the invention should be limited by the appended claims alone.

BRIEF DESCRIPTION OF THE DRAWINGS

The various aspects of the invention will now be described with reference to the accompanying drawings in which.

DETAILED DESCRIPTION OF WORKING EMBODIMENT

Figure 1:
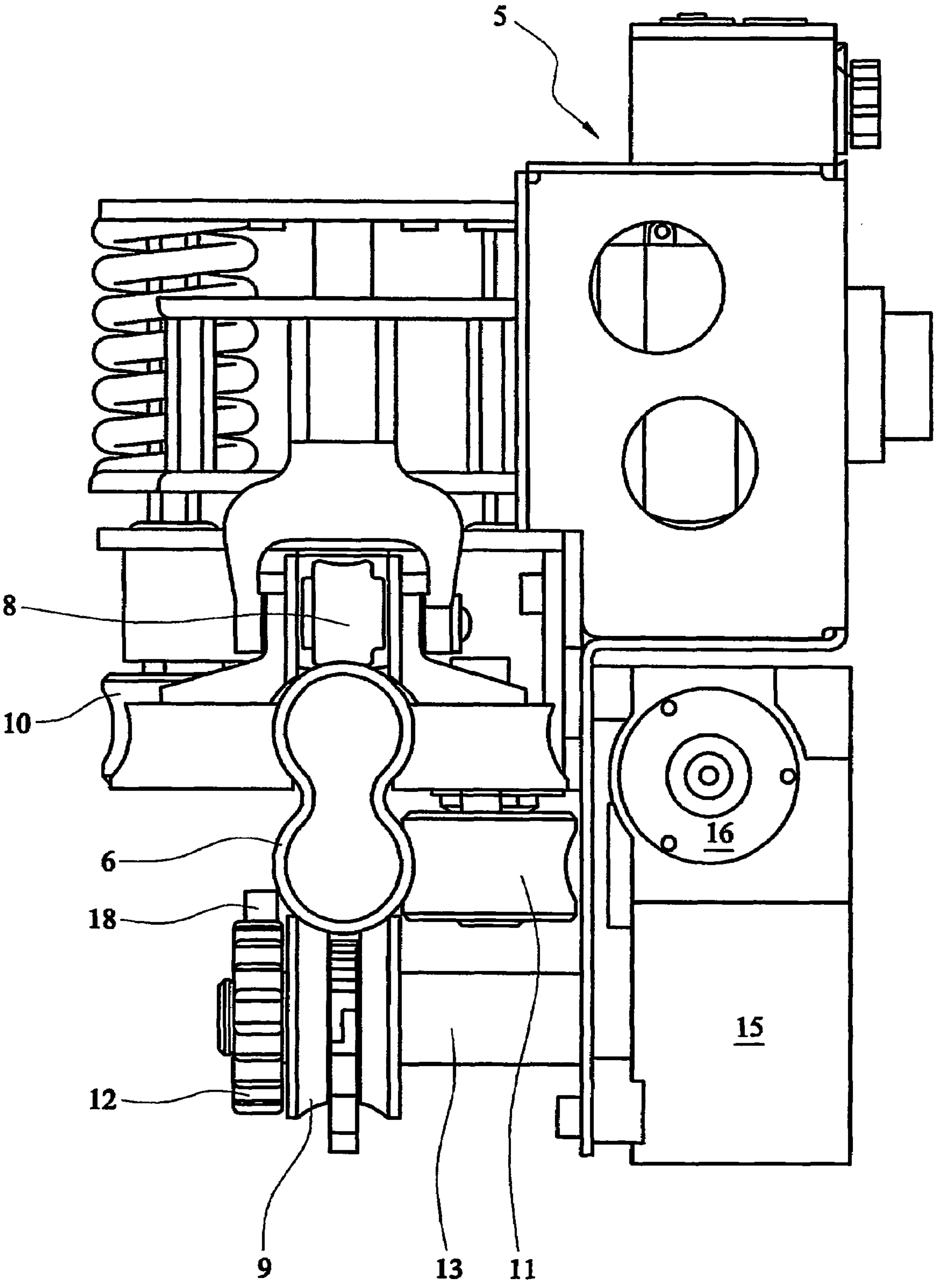
FIG. 1: shows a cross-section of a stairlift carriage mounted on a stairlift rail according to the invention.

Referring to FIG. 1, a stairlift carriage 5 is shown mounted on rail 6 for rolling movement along the rail. To this end, the carriage 5 includes a plurality of upper support rollers, one of which is indicated by reference numeral 8; a bottom roller 9; and reaction rollers 10 and 11. It will be noted that the rollers 8 and 9 bear against the top and bottom surfaces, respectively, of the rail 6. The rollers 8 support the vertical component of load imposed by the carriage on the rail. The roller 9 contributes more when the carriage is traversing an inclined section of the rail and resists the tendency of the carriage to lift from the rail.

It will be noted that the rollers 10 and 11 engage lateral surface parts of the rail and are intended, primarily, to resist the tendency of the carriage 5 to rotate about the axis of the rail 6.

As can also be seen in FIG. 1, a drive pinion 12 may be provided mounted on the same axis as the bottom roller 9, the drive pinion 12 being keyed to the output shaft 13 of gearbox 15 driven from motor 16. The pinion 12 engages a rack 18 fixed to the lower rear surface of the rail 6.

The precise carriage configuration does not form part of the invention. By way of example, the carriage and roller configuration may be as described in our published International Patent Application WO 02/064481 the contents of which are incorporated herein by way of reference.

Figure 2:
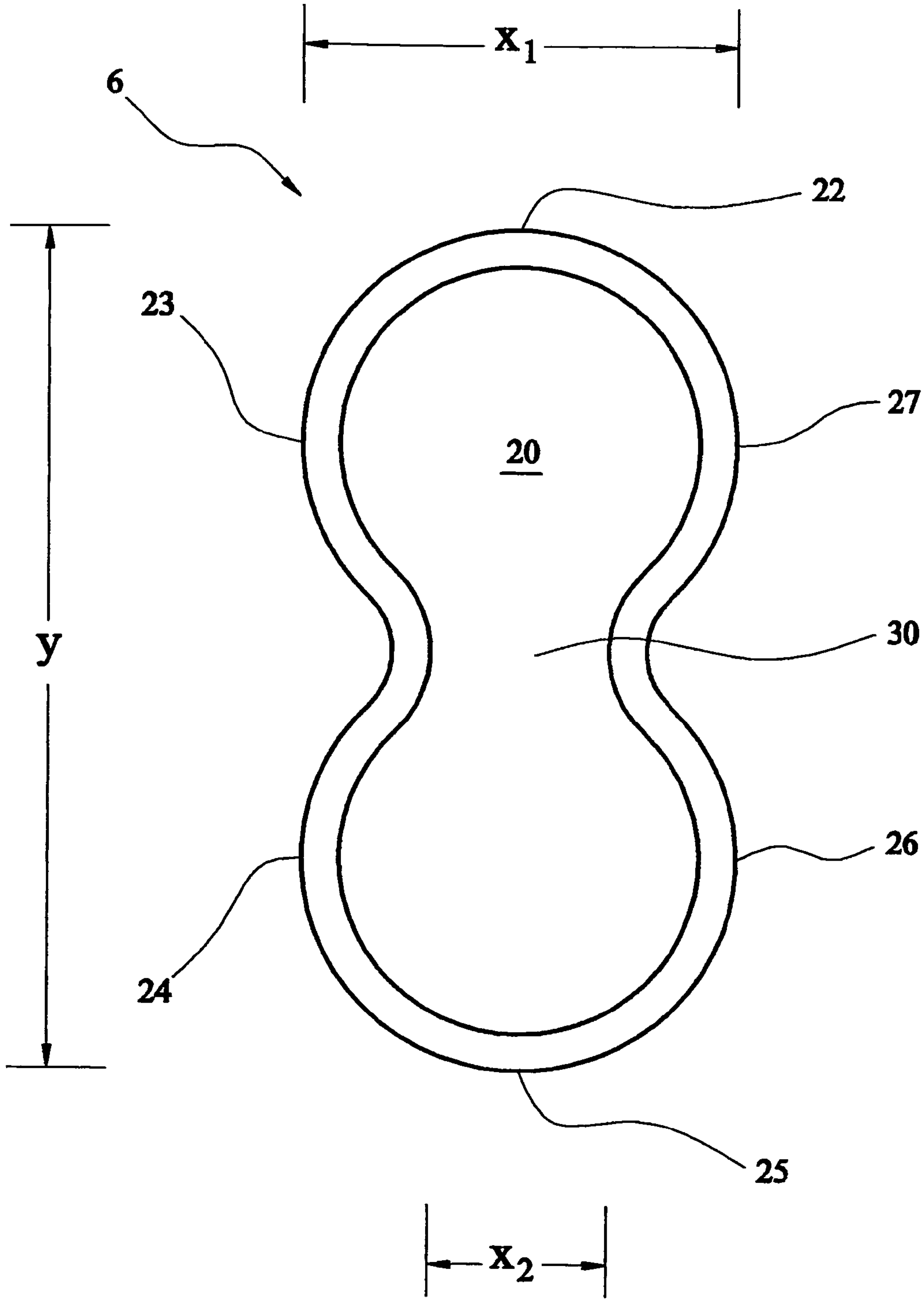
FIG. 2: shows an enlarged cross-section of the stairlift rail shown in FIG. 1.

Turning now to FIG. 2, the cross-section of rail 6 is non-circular and defines a single internal cavity 20. In this way, the benefits of forming a stairlift rail from a single member are realised, yet provision is built in to the shape of the rail to ensure that carriage stability can be achieved without the need to fabricate and fix further components to the outside surface of the rail. A further feature of the preferred form of rail described herein is that the rail cross-section is devoid of right-angled corners.

The particular form of rail shown in FIGS. 1 and 2 is shown aligned in its preferred position of use. As can be seen, the vertical rail dimension y is greater than the lateral dimension $x_1$. More particularly, y is preferably in the order of $2x_1$. It will be appreciated that this is so because the greatest bending strength or resistance to bending is required in the y or vertical axis. As can be seen a waist of internal dimension $x_2$ is formed in the rail at the mid-height of the rail.

In one working embodiment the y dimension may be in the order of 90 millimetres, the $x_1$ dimension in the order of 45 millimetres, and the $x_2$ dimension in the order of 25 millimetres. The limited $x_1/x_2$ dimensions, in combination with a metal gauge of 4 mm, means that the rail 6 may be formed into inside bends of radii in the order of 150 to 200 millimetres. This is considerably less than the radii which can be achieved using rails formed from a single round tube of 76 mm diameter. As a consequence, the rail can be tailored far more closely to the contours of the staircase. Further, tight inside bends can be formed at the bottom of the rail, wrapping the rail around the lower end of the stair, so that, when the stairlift is not in use, the carriage can be stored off the stairway, space permitting.

It should be appreciated that, whilst the embodiment depicted in the drawings, and the above description, is based on the rail being aligned with its major dimension aligned vertically, this is by no means essential. If necessary or desired, the rail could be aligned in other modes. For example, the major dimension of the rail could be aligned horizontally.

The rail 6 has a number of roller engagement surfaces 22, 23, 24, 25, 26 and 27, not all of which may by used in a particular application. It will be appreciated from FIG. 1, however, that the surface part 22 will generally bear the downward component of load imposed by the stairlift carriage and a user born by the carriage, whilst any two or more of the surfaces 23, 24, 26 and 27 will generally serve to resist rotation of the carriage about the axis of the rail.

It will be noted that the roller engagement surface parts 22,23, 24, 25, 26 and 27 are all arcuate in form (when viewed in cross-section) and one rail part curves gently into adjacent rail parts. In this way, rollers bearing on the rail parts can move, to a limited extent, about the axis of the rail. This feature is particularly advantageous in situations in which the carriage is traversing a helical bend in the rail. In such situations the top rollers which are offset from the centreline of the carriage will see an element of twist in the rail. Thus the rollers can rotate about the axis of the top section of the rail (or translate across surface part 22) to adopt more correct geometry whilst maintaining carriage stability.

A further advantage of the rail 6 is that the 'under-tucking' achieved by adjacent parts of surfaces 23/24 and 26/27 (and which defines waist $x_2$) contributes to the bending strength of the rail 6, regardless of the alignment of the rail, in use.

It will also be noted that the rail 6 is symmetrical about vertical and horizontal axes passing through the geometric centre 30 of the rail. This double symmetry in combination with the lack of right angle corners in the section, allows roll forming of the rail from flat strip material. Further, the symmetry about both vertical and horizontal axes means that the rail can conveniently be bent, using substantially conventional pipe bending equipment (though with purpose formed dies), into transition bends, inside/outside bends and helicals. This considerably simplifies the whole process of rail forming and eliminates many of the manual tasks inherent in forming rails according to the prior art.

The particular form of rail described herein is believed to have the following significant advantages over the forms of stairlift rail, particularly curved stairlift rail, currently in use:

(i) Since the rail is formed as a single component using precision metal forming techniques, the alignment and spacing problems inherent current, multi-component fabrications, are avoided.

(ii) By providing for carriage stability in the cross-section of the rail, the need to fabricate and fix a separate anti-torque or stability member to the exterior surface of a round tube rail is avoided.

(iii) By arranging the rail cross-section about two axes of symmetry, and ensuring the cross-section is devoid of right angles, the rail can be readily formed into inside/outside bends, transition bends, and helicals.

(iv) Rail curves are formed using substantially conventional tube bending equipment.

The invention claimed is:

1. A tubular rail for a curved stairlift, the angle of said rail when mounted on a stairway varying with respect to a horizontal plane, said rail comprising:

i) a cross-section having an internal surface and an external surface, said internal surface defining a single cavity within said rail;

ii) a major axis, and a minor axis perpendicular to said major axis, said major and minor axes being unequal and said cross-section being symmetrical about both of said major and said minor axes; and iii) the dimensions of said rail varying in the direction of at least one of said major and minor axes.

2. A tubular stairlift rail as claimed in claim 1 for use with a stairlift carriage, said carriage having support rollers to support said carriage for movement along said rail, said rail having roller engagement surfaces formed in the outer periphery thereof, said roller engagement surfaces being configured to, in combination with said rollers, prevent rotation of said carriage about said rail.

3. A rail as claimed in claim 2 wherein the arrangement of said roller engagement surfaces about the cross-section of said rail is configured to contribute bending strength to said rail.

4. A rail as claimed in claim 2 wherein said roller engagement surfaces are arcuate when viewed along the cross-section of said rail.

5. A rail as claimed in claim 1 wherein the minimum dimension of said rail perpendicular to said major axis is co-incident with said minor axis.

6. A rail as claimed in claim 1 wherein, when aligned in its intended mounting position, said minor axis is generally horizontal.

7. A rail as claimed in claim 1 wherein the maximum dimension of said rail in the direction of said major axis is in the order of twice the maximum dimension of said rail in the direction of said minor axis.

8. A rail as claimed in claim 1 wherein the maximum dimension of said rail perpendicular to said minor axis is co-incident with said major axis.

9. A rail as claimed in claim 1 wherein, when viewed in cross-section, each section of rail defining an end of said major axis has a curvature of constant radius.

* * * * *